(12) United States Patent
Treman et al.

(10) Patent No.: US 10,880,679 B2
(45) Date of Patent: Dec. 29, 2020

(54) METHOD AND APPARATUS FOR DYNAMIC LOCALIZED COORDINATE DOWNLOAD

(71) Applicant: FORD GLOBAL TECHNOLOGIES, LLC, Dearborn, MI (US)

(72) Inventors: Peter Treman, Commerce Township, MI (US); Jacob Gaiski, Ann Arbor, MI (US); Matthew Charles Cross, Lake Orion, MI (US); Karen S. Maceachern, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/694,475

(22) Filed: Nov. 25, 2019

(65) Prior Publication Data

US 2020/0169836 A1 May 28, 2020

Related U.S. Application Data

(63) Continuation of application No. 15/184,382, filed on Jun. 16, 2016, now abandoned.

(51) Int. Cl.
| | |
|---|---|
| *G01C 21/34* | (2006.01) |
| *G06Q 20/12* | (2012.01) |
| *H04W 4/021* | (2018.01) |
| *H04W 4/44* | (2018.01) |
| *H04W 4/029* | (2018.01) |
| *G01C 21/32* | (2006.01) |
| *H04W 4/02* | (2018.01) |

(52) U.S. Cl.
CPC ............ *H04W 4/021* (2013.01); *G01C 21/32* (2013.01); *H04W 4/027* (2013.01); *H04W 4/029* (2018.02); *H04W 4/44* (2018.02)

(58) Field of Classification Search
CPC ..... H04W 4/021; H04W 4/029; H04W 4/022; H04W 4/40; H04W 4/023; H04W 4/027; H04W 4/024; H04W 4/46; H04W 4/02; H04W 4/025; H04W 64/00; G06Q 30/0261; G06Q 10/08355; G06Q 20/3224; G06Q 30/0265; G08G 5/045
See application file for complete search history.

(56) References Cited

U.S. PATENT DOCUMENTS

| | | | |
|---|---|---|---|
| 2014/0121932 A1* | 5/2014 | Zeng | ............ B60W 10/06 701/93 |
| 2014/0278090 A1 | 9/2014 | Boes et al. | |
| 2015/0066366 A1* | 3/2015 | Pang | ............ G06Q 20/14 701/532 |

FOREIGN PATENT DOCUMENTS

EP        2982936 A1    2/2016

* cited by examiner

*Primary Examiner* — Gary Lafontant
(74) *Attorney, Agent, or Firm* — Michael Spenner; Brooks Kushman P.C.

(57) ABSTRACT

A system includes a processor configured to receive vehicle speed and heading. The processor is also configured to determine a local data set having coordinates reachable by a vehicle traveling at a projected speed based on the received speed and heading within a predetermined amount of time. The processor is further configured to define a geo-fence at a distance from a local data set perimeter such that a vehicle reaching the geo-fence at the received speed will have time to download new local data before reaching the local data set perimeter and send the geo-fence definition and coordinate data within the local data set to the vehicle.

17 Claims, 9 Drawing Sheets

METHOD AND APPARATUS FOR DYNAMIC LOCALIZED COORDINATE DOWNLOAD

CROSS-REFERENCE TO RELATED APPLICATIONS

This application is a continuation of U.S. application Ser. No. 15/184,382 filed Jun. 16, 2016, now abandoned, the disclosure of which is hereby incorporated in its entirety by reference herein.

TECHNICAL FIELD

The illustrative embodiments generally relate to a method and apparatus for dynamic localized coordinate download.

BACKGROUND

Vehicle telematics units and infotainment units provide a variety of user experience enhancing functions and features in the vehicle environment. Users can download data, music, movies, and software updates and generally communicate with remote computing systems through a telematics unit. Infotainment units provide vehicular interactivity, including, but not limited to, media playback, media requests, call handling, and navigation features.

Navigation is a feature that has been available in vehicles long before the advent of telematics units using brought-in devices such as GARMIN™ and TOMTOM™ devices. In those original devices, map data was pre-stored on the device. This was useful if connectivity to obtain new data was not available, but suffered from limitations because traffic, road-changes and generally any data that was developed following a map update was unavailable on the device. A similar solution was used with the original in-vehicle navigation units, which used data stored in memory or on CDs/DVDs to provide navigation directions.

Modern navigation systems, such as those running on an infotainment system, can use the telematics control unit (TCU) to access remote data storage in response to a navigation request. This allows for both use of off-board processing to handle the request, and download of data that reflects a present or near-present state of the roads and surrounding environments. While a vehicle may store some limited subset of data relating to a current route or frequently traveled areas, navigation requests will often result in the download of new data. Also, since a vehicle mapping unit will typically show the road network surrounding a vehicle at some level, either a large amount of data or a series of small data requests will be needed to keep this display updated, even in the absence of a specific navigation request.

Also, some applications running on a vehicle or device connected to the vehicle, such as advertising applications, may leverage localized map data. When these applications need local data, there is a tug-and-pull between the need to limit data transfer (due to costs and/or bandwidth constraints) and simultaneously provide enough data so that the application can function to the best of its ability. A traditional approach that is more application-friendly (e.g., designed to ensure the application has all data it possibly needs) is to download a large area of data surrounding a vehicle. While this almost always ensures that sufficient data for application processing is available, it also often results in a download of a large amount of data that is virtually useless. Data unrelated to the vehicle direction of travel has limited value. Likewise, data associated with features perpendicular to the direction of travel is largely useless outside a certain range, unless a turn is performed. The vehicle will likely travel outside the range of downloaded data at some point, creating a need for a new download. Downloading data having limited use to a user may unnecessarily consume bandwidth and data.

SUMMARY

In a first illustrative embodiment, a system includes a processor configured to receive vehicle speed and heading. The processor is also configured to determine a local data set having coordinates projected to be reachable by a vehicle traveling at a projected speed, based on the received speed and given the received heading, within a predetermined amount of time. The processor is further configured to define a geo-fence having a perimeter at a distance from a local data set perimeter such that a vehicle reaching the geo-fence perimeter at the received speed will have time to download new local data before reaching the local data set perimeter and send the geo-fence definition and coordinate data within the local data set to the vehicle.

In a second illustrative embodiment, a system includes a processor configured to determine a local data boundary and a geo-fence boundary for triggering a new-data request, the local data boundary defining coordinates projected to be reachable by a vehicle within a predetermined time-period, and the geo-fence boundary interior to the local data boundary, responsive to a local data request. The processor is also configured to transmit the geo-fence boundary and coordinate data, representing map data within the local data boundary, to a vehicle.

In a third illustrative embodiment, a system includes a processor configured to receive local map data, a geo-fence, and maximum expected travel speed, the geo-fence defining when new local map data should be requested. The processor is also configured to track vehicle progress until the geo-fence is encountered. The processor is further configured to request new local map data upon encountering the geo-fence and if vehicle speed exceeds the maximum expected travel speed, redefine the geo-fence to be closer to a vehicle location than the originally received geo-fence.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
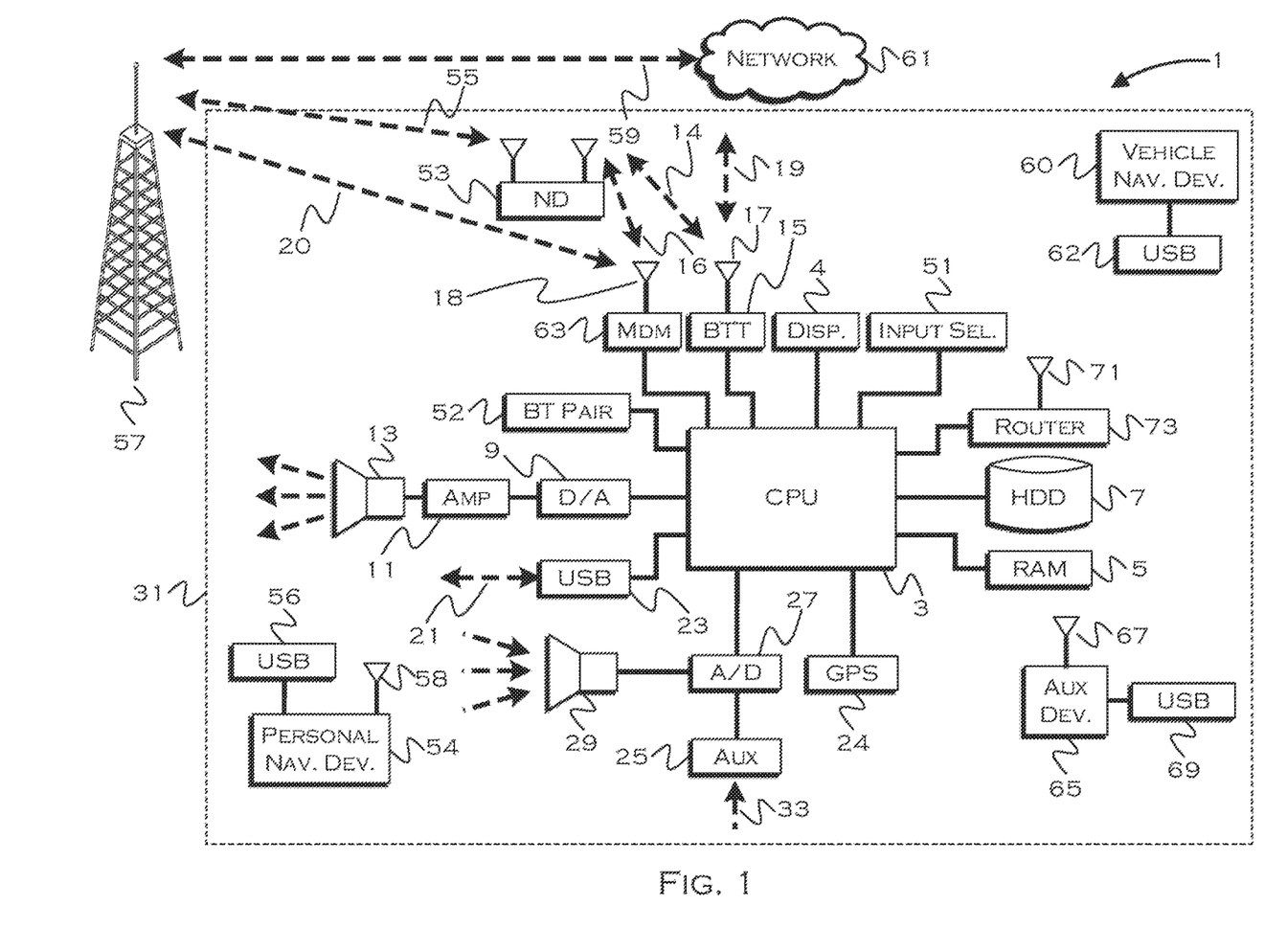
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment I shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modern application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Vehicle telematics control units TCUs utilize connectivity options to provide wireless signal transmission and receipt between a vehicle and remote devices. Typically, this includes a cellular signal, provided (as previously noted) by either an onboard vehicle modem or a user wireless device wireless or wiredly connected to the TCU. When an onboard modem is provided, it is not uncommon to include a cellular provider plan and to tie the modem to a cellular network operator associated with the included plan.

Vehicle telematics units typically utilize either an onboard modem or user-device connected to a vehicle computer to access remote data networks. In either case, a cellular plan is leveraged to provide the communication between the vehicle and the remote network. Since there are bandwidth constraints on data download via cellular, downloading large amounts of data can take some time. While a typical download of a large amount of map data may be measured in a matter of tens of seconds, this can significantly impact the usefulness of the data to a vehicle traveling at 50 or 60 miles per hour. This impact can be especially felt if a localized portion of the data is needed quickly, such as to provide some quick advice about a local turn or local establishment. The relevant local data (at the time the data was requested) may be close to a mile behind the vehicle by the time that the entire large set of map data is downloaded and usable.

Also, most cellular plans carry some data-volume restrictions, with very high costs charged to users who exceed the volume restrictions. While a user may generally manage their data usage, and may willingly use some portion of that usage to download vehicle-requested or application-requested data, the user likely does not want to utilize excess data download in furtherance of obtaining map information that may be largely or completely irrelevant to a particular journey.

By tying the amount of data downloaded to a particular vehicle speed, the illustrative embodiments dynamically adjust and accommodate for a "useful" data region surrounding a vehicle. This allows for quick, usable data downloads, with pertinent localized data, the size of which can be dynamically adjusted based on vehicle speed. For example, a user traveling at sixty miles per hour down a highway with no exits for twenty miles probably has little use for the data on roads presently nearby the highway (having no way to access those roads). Similarly, data behind the vehicle could not be used at any point until the vehicle had traveled twenty miles, exited, turned around and traveled twenty miles back in the opposite direction, so that data too is likely of little interest to the user.

By accommodating for both travel speed and, if desired, possibility of turns/exits, under the illustrative embodiments the requested data amount and map shape can be dynamically adjusted so that only likely-useful data is downloaded. This can limit both download time and data usage. By providing a threshold geo-fence defining when new data should be downloaded, the current usable set of data can be kept up-to-date (from a usefulness perspective) and refreshed prior to ever encountering an off-map (in terms of the presently downloaded map) location. The geo-fence can define a limit wherein the time needed to download new local data (based on, for example, observed data transfer rates) is not exceeded between the time the vehicle reaches the geo-fence and subsequently travels beyond the known local data. The data rate may represent a projected rate (a best-guess, since it can dynamically change) and the size of the local map data may also be projected based on previous downloads, or it may be fixed or predetermined.

Figure 2:
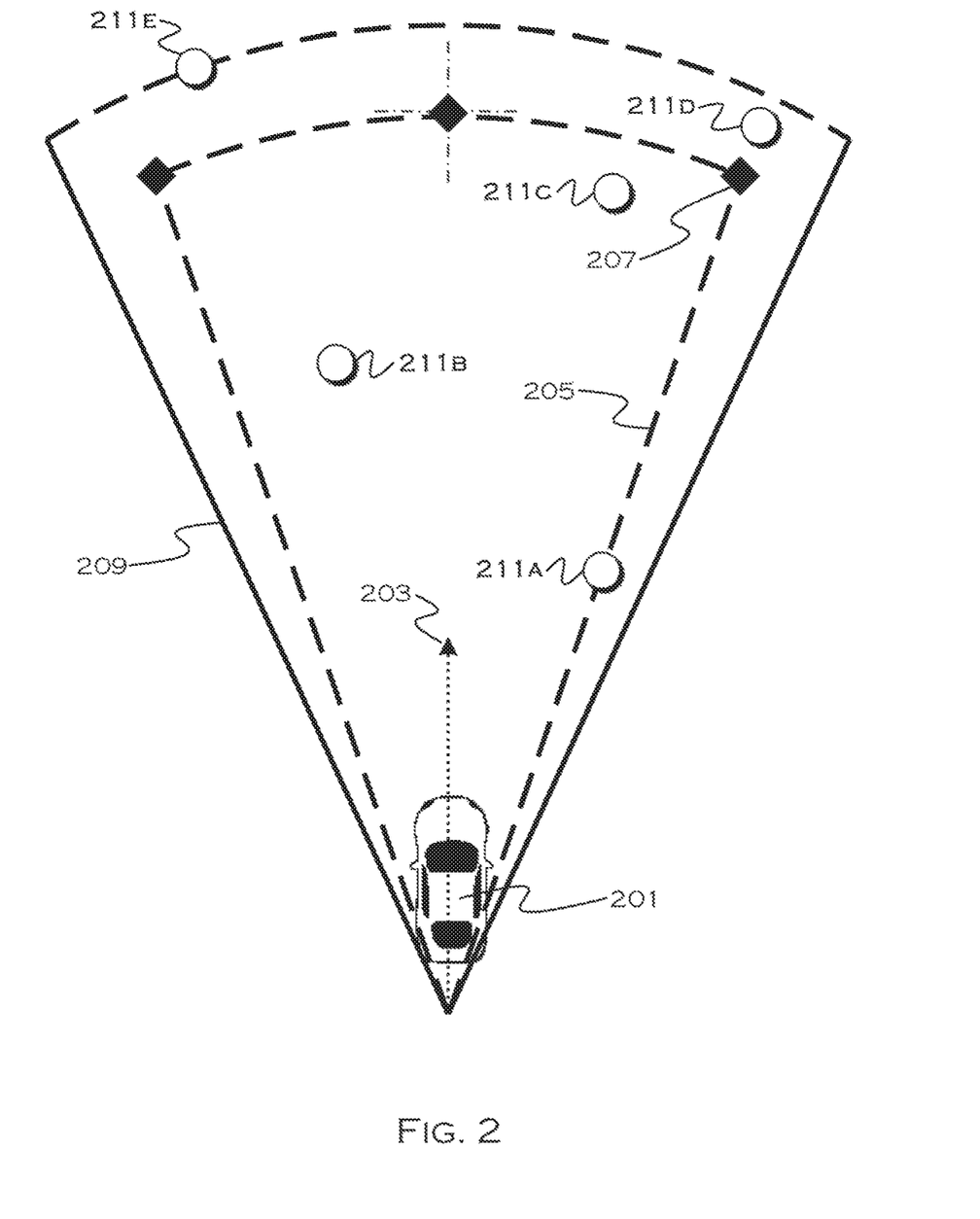
FIG. 2 shows an illustrative example of a vehicle data-download area and a new-data geo-fence.

FIG. 2 shows an illustrative example of a vehicle data-download area and a new-data geo-fence. This example demonstrates one illustrative shape of a data download as well as an illustrative shape of a proposed geo-fence defining when new data should be downloaded.

In this example, the vehicle 201 is traveling on heading 203. Based on an estimated download time and vehicle speed, a boundary 209 is defined such that the data within the boundary will be downloaded and usable prior to the vehicle reaching the edges of the boundary. In this example, this includes relevant data points 211a, 211b, 211c, 211d and 211e. Data outside the boundary is not downloaded at this time, as the vehicle should not, at the present speed, reach any of those data points outside the boundary prior to the data defined by sector 209 being downloaded.

Additionally, a geo-fence 205 is defined based on at least vehicle speed. This fence may also be definedadjusted based on where an actual road network exists, and based on the likelihood of turns adjusting vehicle speed (a projected vehicle slow down), because a vehicle traveling at 60 miles per hour will likely need to slow down to turn. This geo-fence defines a series of points which, if reached by the vehicle, should trigger an additional new data download. The new data download is defined in scope based on vehicle speed and download time, as before. The fence 205 is defined (again based on download time and speed) having a distance from the outer sector-boundaries such that by the time a vehicle travels from a fence-edge to a sector edge, the new data set requested when the fence was reached will be downloaded. In this manner, the vehicle is constantly updating the localized data set before the vehicle travels outside the range of the data set.

It is possible that a user may suddenly accelerate upon reaching the fence and reach the sector boundary prior to the new data being downloaded. Assumptions based on vehicle speed, road speed limits, possible turns and observed user behavior can accommodate for most instances, however, such that only in rare instances of unexpected or abnormal driving behavior will the sector perimeter 209 be breached by a vehicle prior to download of new data. Since the fence 205 can be dynamically adjusted based on vehicle speed, if a user accelerates prior to reaching the fence (even unexpectedly), the fence boundaries can be pulled inwards towards the vehicle, such that new-data download will occur sooner to accommodate for the increased speed. The vehicle may also have a set of parameters loaded thereto, defining speed maximums, and if these are exceeded the vehicle may dynamically adjust the fence borders. The speed maximums can be based on local map data defining speed limits for roads within the local map. It can be, for example, set to a maximum speed limit for the highest speed limit within the map data (essentially assuming the worst-case scenario if the vehicle takes the fastest road) or may be individually defined for a given road. It may also be adjusted by a tolerance (since it is not unreasonable to expect some level of speeding).

For any given vehicle, at a specific speed, two circular sectors of data may be generated in the cloud. The first sector may be a larger area containing semi-local data in which valid coordinates may be provided by the cloud. This could be defined based on a predetermined area around a given vehicle traveling at a given speed, or based on some other predefined criteria that defines a reasonably sized sector of possibly requested data. The larger sector typically contains sufficient semi-local data to allow for at least a present iteration of local data and a successive iteration of local data to be downloaded without having to refresh the area represented by the semi-local data.

While the illustrative embodiments present the notion of possibly downloading an entire map-data set to the vehicle, represented by the local data, it is also possible that both data sets are representative of particular objects of interest (e.g., without limitation, potholes, service stations, construction incidences, etc). That is, the larger data set may be all semi-local coordinate points representing potholes or known construction, and the smaller local data set may be these instances within the defined perimeter. This data can be overlaid on top of existing map data or otherwise populated onto a vehicle display or into a vehicle navigation program to represent the local instances of objects/occurrences of a requested type. In such embodiments, the data sets will likely be much smaller than entire map data sets, and relevant data on particular objects of interest can be obtained in an efficient and relevant manner.

A second, smaller circular sector may be defined representing an area within which a local database (the data sent to the vehicle in the present/last request) is valid. This smaller sector will be within the larger sector. At any point the vehicle travels outside the smaller sector, it will likely request new data (if it has not already done so) from the cloud, the new data coming from the present larger sector (which may also be dynamically redefined on each request, so that the sectors move along a larger map as the vehicle travels). These sectors are not necessarily centered about the vehicle, but may be defined so as to largely represent data points ahead of the vehicle, and to the sides, along known paths (defined by map data). This would generally place the vehicle closer to an edge of the circular area (as opposed to at the center), with the bulk of the circle defining a region forward of and to the sides of the vehicle.

Because the cloud-based sectors are dynamically redefinable, if the vehicle slowed to turn 180 degrees or suddenly reversed (which would also typically require a slow down), and because a geo-fence defining points for new coordinate request is generally in close proximity to current vehicle sides and rear position, the close-by fence would likely be soon breached by the slow moving vehicle with little travel in a sideways or rear direction. This would cause a new data request, which in turn would redefine the sectors in an area that was still largely ahead of and to the sides of the new vehicle heading. Since the vehicle (in most normal situations) had to slow down to turn around or reverse, by the time the vehicle is back up to traveling speed the new sectors would be defined and instituted for usable data in the direction the vehicle is now heading.

Figure 3A:
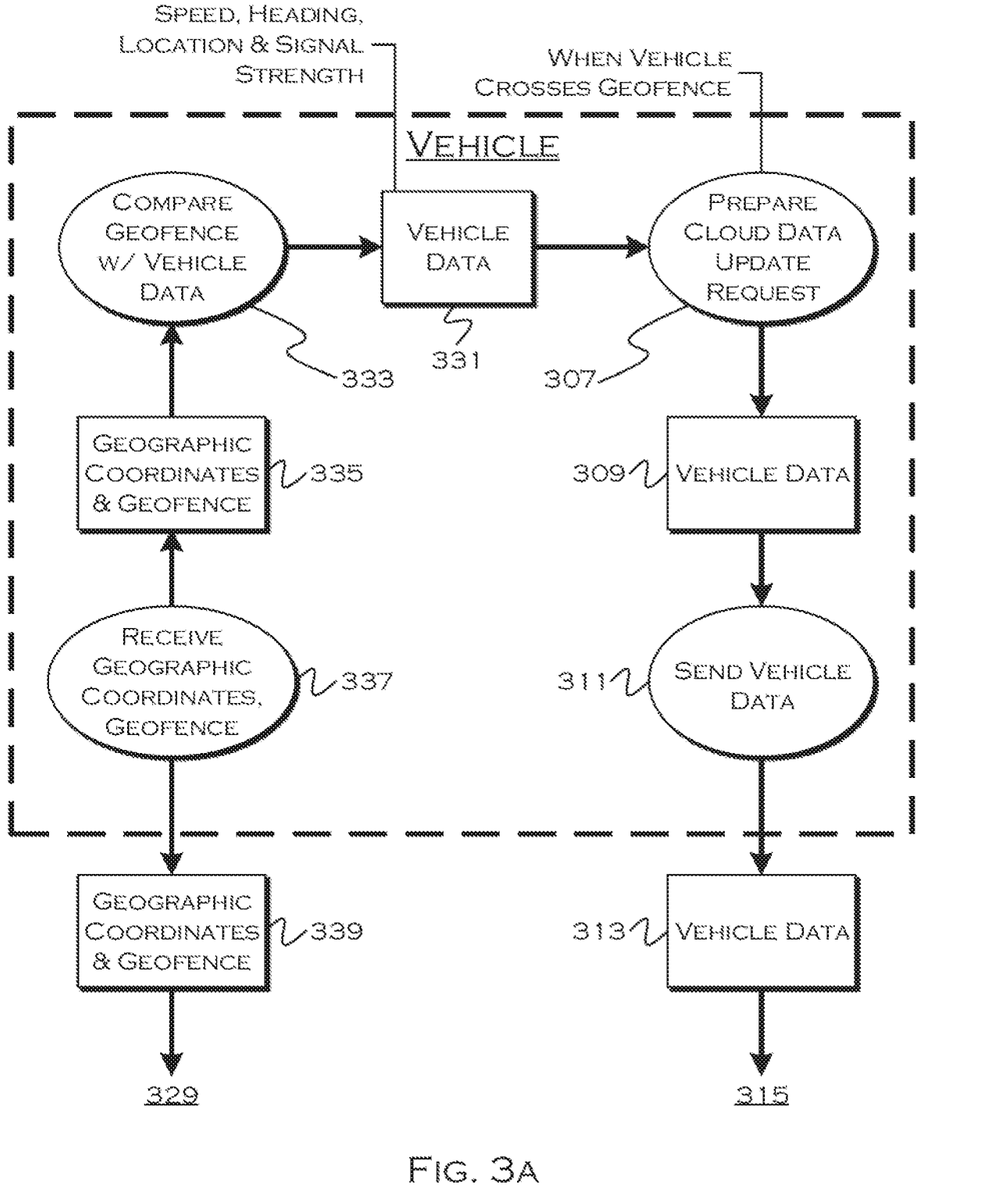
FIG. 3A shows an illustrative flow for map data request handling.
Figure 3B:
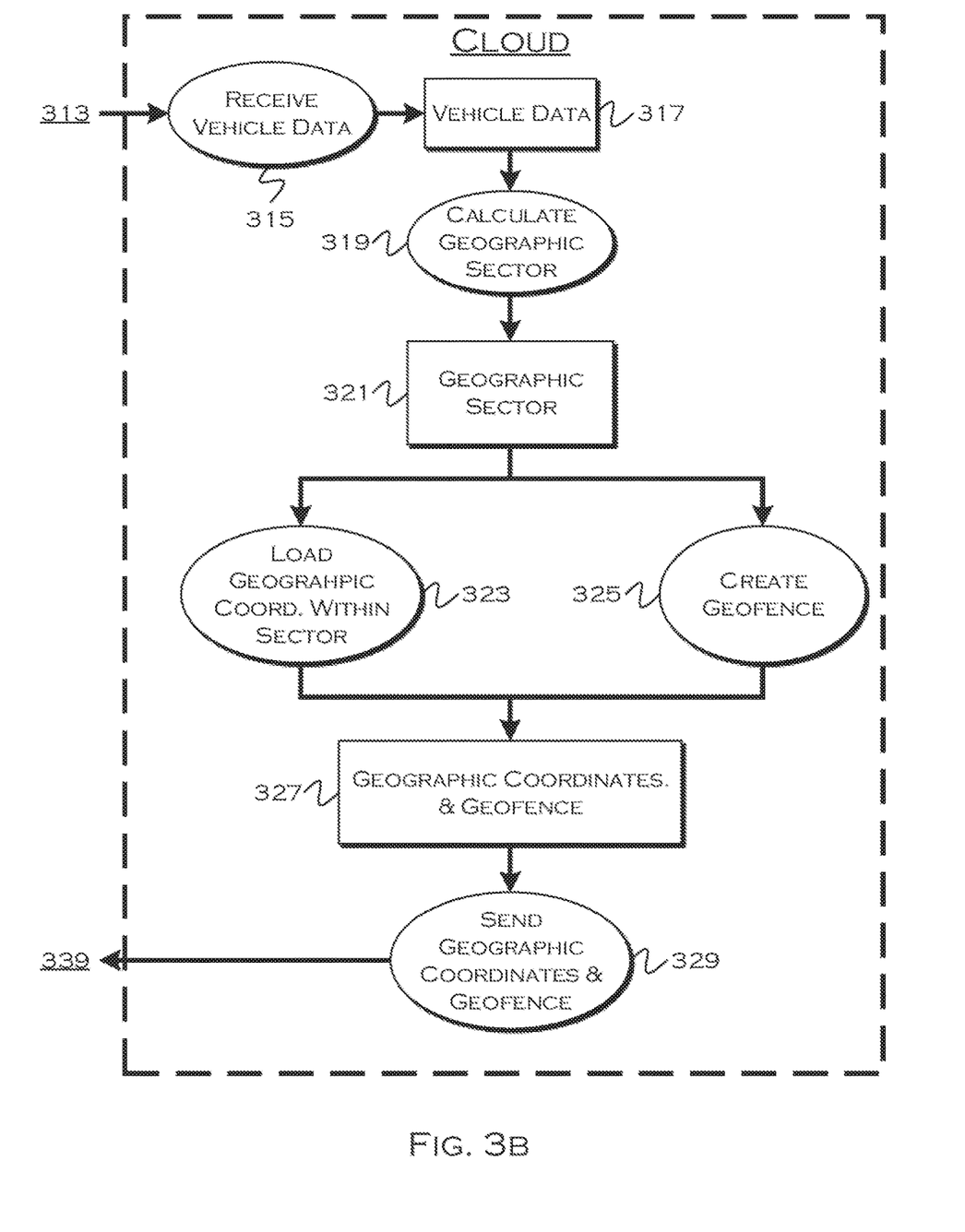
FIG. 3B shows an illustrative flow for map data request handing.

FIG. 3A and FIG. 3B show an illustrative flow for map data request handling. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

At some point in a journey, an initial set of map-data (or locations of coordinates of interest with respect to one or more categories of objects and instances of interest) will be established for the vehicle, which is likely at the onset of the journey. This data may be square or circular (or other reasonable shape) in nature, since the vehicle initially requests the data in a parked-state before travel begins. Since it may not be known in which direction the vehicle is traveling, this data surrounding the vehicle largely equally on all sides will represent the possible travel points or points of interest within some predetermined time-period or distance.

Included with this initial definition of local map/coordinate data is a geo-fence, which may be defined by the vehicle initially and then adapted based on heading and speed as the vehicle begins the journey. As noted, the fence is defined/adapted such that a vehicle breaching the fence will obtain new, useful local map data before traveling outside a region represented by a presently stored set of map data. So, for example, the initial fence may be one mile from the vehicle in every direction, and the initial data set may be three miles from the vehicle in every direction (these boundaries may be adjusted based on, for example, without limitation, available signal strength and bandwidth, an indicia of which may be sent to the cloud). If the vehicle begins to travel north at 40 miles per hour, the fence may be redefined to approximate the fence shown in FIG. 2, such that a wider area of the fence is ahead of the vehicle and the fence narrows as it approaches the vehicle location. The perimeter of the fence can be redefined at a proximity to the local map/coordinate data perimeter such that the vehicle will have ample time to download new data before the 40 mile per hour speed carries the vehicle through the region between the fence perimeter and local map data perimeter.

Once the fence is reached 305 by the vehicle 301, a process onboard the vehicle 301 prepares a cloud-data update request 307. This request includes sending vehicle data (such as, but not limited to, heading, speed and any final destination or route). The vehicle data 313 is sent 311 to the cloud 303.

A remote server receives 315 the vehicle data 317 and calculates 319 the geographic sector 221. This is the larger sector in which the cloud will store a large version of semi-localized data. From this data, new data requests can be pulled without having to search an even larger set of map/coordinate-data for a new set of data. As can be seen from this figure, however, this larger sector can be dynamically updated as a vehicle moves, to keep the data set current for a vehicle location, such that any new data request should be fulfillable from data available in this larger sector. If the data relates to coordinates of objects (e.g., potholes) or instances (e.g. construction) of interest, the request may also include an identifier identifying the type of object or instance to which the interest is directed. Thus, if a database stored pothole coordinates, this database could be accessed in response to a pothole request, or if a database stored construction coordinates, this database could be accessed in response to a construction request.

Within the larger sector, two geographic elements are defined. The first is the localized geographic coordinates which will represent the local data download 323. The second sector is the geo-fence that will define when a new coordinate set is requested 325. In this example, the cloud defines the geo-fence. In previous examples, it was discussed that the vehicle could dynamically update the geo-fence based on changing vehicle parameters. It is possible that geo-fence definition and update is solely the province of the cloud, solely the province of the vehicle, or is shared in some reasonable manner (e.g., without limitation, the cloud defines the initial fence and the vehicle updates this fence as needed).

It is noted that a non-updated (from a vehicle-perspective) fence defined by the cloud is sufficient in many situations, if the fence is defined such that any rapid turn, reversal or u-turn will almost immediately encounter the fence. Because the fence is redefined when a new data set is requested, and because any of the noted driving behavior would almost immediately encounter the fence, a new fence oriented in the appropriate direction would be defined upon encountering the old fence. On the other hand, a vehicle which suddenly and unexpectedly accelerates from 25 miles per hour to 60 miles per hour may breach a fence at a rate that does not allow for time of new coordinate set download prior to passing the boundary of the old coordinate set. In these instances, it may be useful to allow the vehicle to dynamically shrink the fence boundaries as the vehicle accelerates (since the original fence may have been defined using the 25 miles per hour speed as an expected speed).

Once defined, the geographic local coordinate set (which could be all local map data or data defining specific coordinate locations of objects and instances of interest) and geo-fence boundaries 327 will be passed 229 back to the vehicle. The vehicle receives 337 this data 339 from the cloud. The geo-fence coordinates 335 are compared 333 with the vehicle location data 331, a process which continues until the fence is breached. At the point of breach, the entire process for requesting data and defining local coordinates and fence boundaries may repeat. In this manner, the vehicle is constantly provided with updated local coordinates in a data-efficient manner, with emphasis placed on providing likely usable coordinate (being those ahead of the vehicle) as opposed to large data set surrounding the vehicle equally in all directions.

Figure 4:
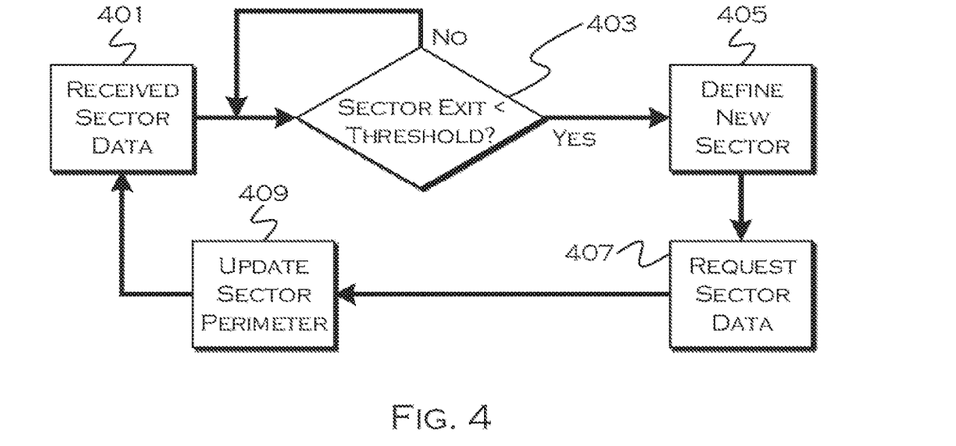
FIG. 4 shows an illustrative process for map data download and sector definition.

FIG. 4 shows an illustrative process for map data download and sector definition. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process demonstrates a dynamically redefinable sector of localized data. For example, an initial sector of data of a certain perimeter and area may be received by the sector update process 401. Examining the roadways in this sector, it is determined if any exits (or turns) exist from the current sector data. For example, if a kite-shaped sector 209 such as that in FIG. 2 is defined for a highway, but the highway branches a short distance ahead of the vehicle, then there is essentially an exit from the sector for which a vehicle will not likely slow (being a highway branch) at close proximity to a vehicle. Because the vehicle will be traveling at a relatively high speed if this alternate route is taken, there may not be sufficient time to re-download a new sector before the sector is needed.

If the vehicle has a possibility (given the speed, heading, and speed limits, for example) of exiting a sector in less time than a new sector download will take (the threshold download time) 403, the process may re-define the sector 405 such that a larger snapshot of local data is provided. The sector may also be re-defined for these instances such that while the main sector still resembles a kite, there is a small offshoot sector of data defined to accommodate for the chance that the vehicle branches. Data for this new, limited sector may be requested 407. It is also possible to simply expand the entire sector perimeter, or change the shape of the geo-fence, but for vehicles traveling at high-enough speeds the most efficient thing to do in terms of data transfer may be to simply request a subset of off-shoot data. The sector and geo-fence perimeter may be updated to accommodate for the new data 409 and the process can repeat if needed.

None of this sector expansion and redefinition is strictly necessary, this illustrative example merely provides one instance of modification of a generalized embodiment to accommodate for fringe-case scenarios. As can be seen, with slight adjustment a still very localized and efficient set of data can be established and downloaded for vehicular use, without unnecessarily using up extra data transfer on relatively extraneous data.

Figure 5:
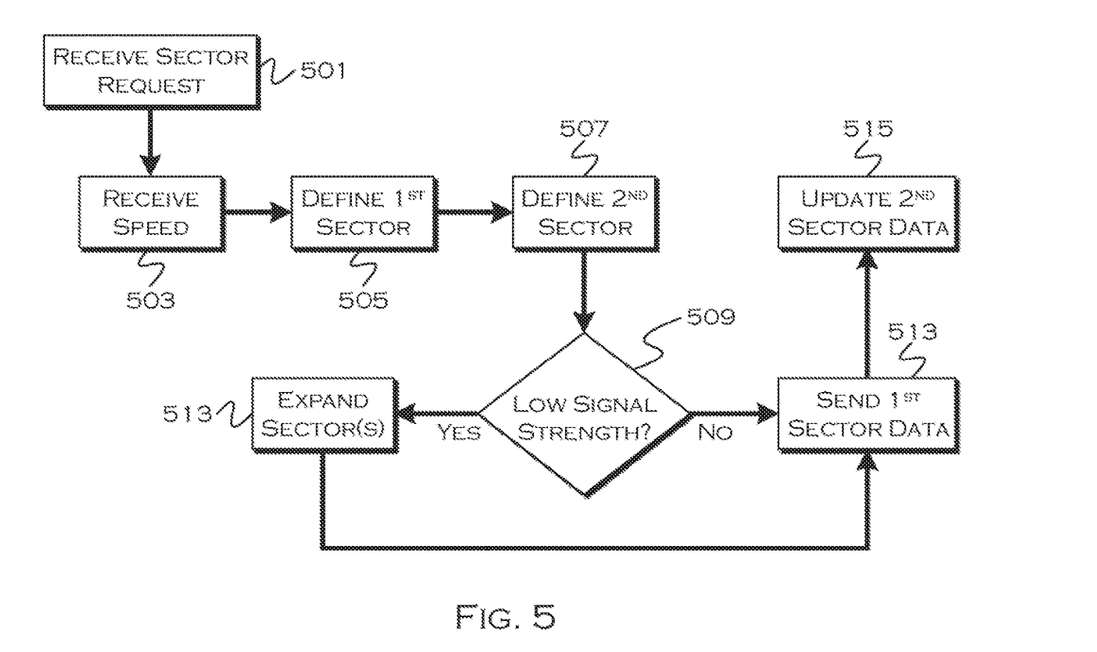
FIG. 5 shows an illustrative process for request handling.

FIG. 5 shows an illustrative process for request handling. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process running on the cloud receives a request for new vehicle data 501. In conjunction with the request, a first sector (defining the localized data) is defined 505 based on received vehicle speed 503. That is, the faster the vehicle is traveling, the larger the sector, in most cases. It is also possible to redefine the broader semi-localized data sector 507 at this point, if needed, to accommodate for the vehicle approaching a perimeter of the second, broader sector. It is not always necessary to redefine the broader sector upon every request, if a large enough second sector is preserved in the cloud, it may only be needed to redefine the second broader sector when the vehicle approaches within a travelable (from a speed, time or distance perspective) distance threshold of the broader sector perimeter.

Also, in this example, the process determines if the communication between the vehicle and the cloud is operating on diminished bandwidth or a relatively low signal strength 509. This can cause the cloud to download a larger sector of local data, in anticipation of a possible lost-signal, so that if a vehicle cannot communicate with the cloud, it does not travel to a location beyond the local map-data. If there is a likelihood of communication loss (in this example demonstrated by a low signal), the process may expand one or both of the sectors 513. Expanding the second broader sector will prevent the vehicle from "suddenly" being at the edge of the broader data set (or off the data set entirely) when communication resumes.

Since the server may not always know that a cellular signal strength has dropped, the vehicle may track the signal strength and send an alert, requesting new and expanded local map data, if the signal drops below a threshold. The alert can also include the cellular signal strength or some indicia thereof, to allow the server to determine how much expansion of local map data should be included.

The server can determine an approximate data transfer rate based on previously observed communication between the server and the vehicle. Or, in another example, the server may receive information dictating a minimum or maximum data transfer rate. The size of the download may be based on predetermined limits or based on observed previously transferred data sets for vehicles traveling under similar conditions (similar speed, similar road-type, etc).

The first local sector data is then sent to the vehicle 511, and the second sector is updated to reflect a stored state of where the local data was provided 515.

Figure 6:
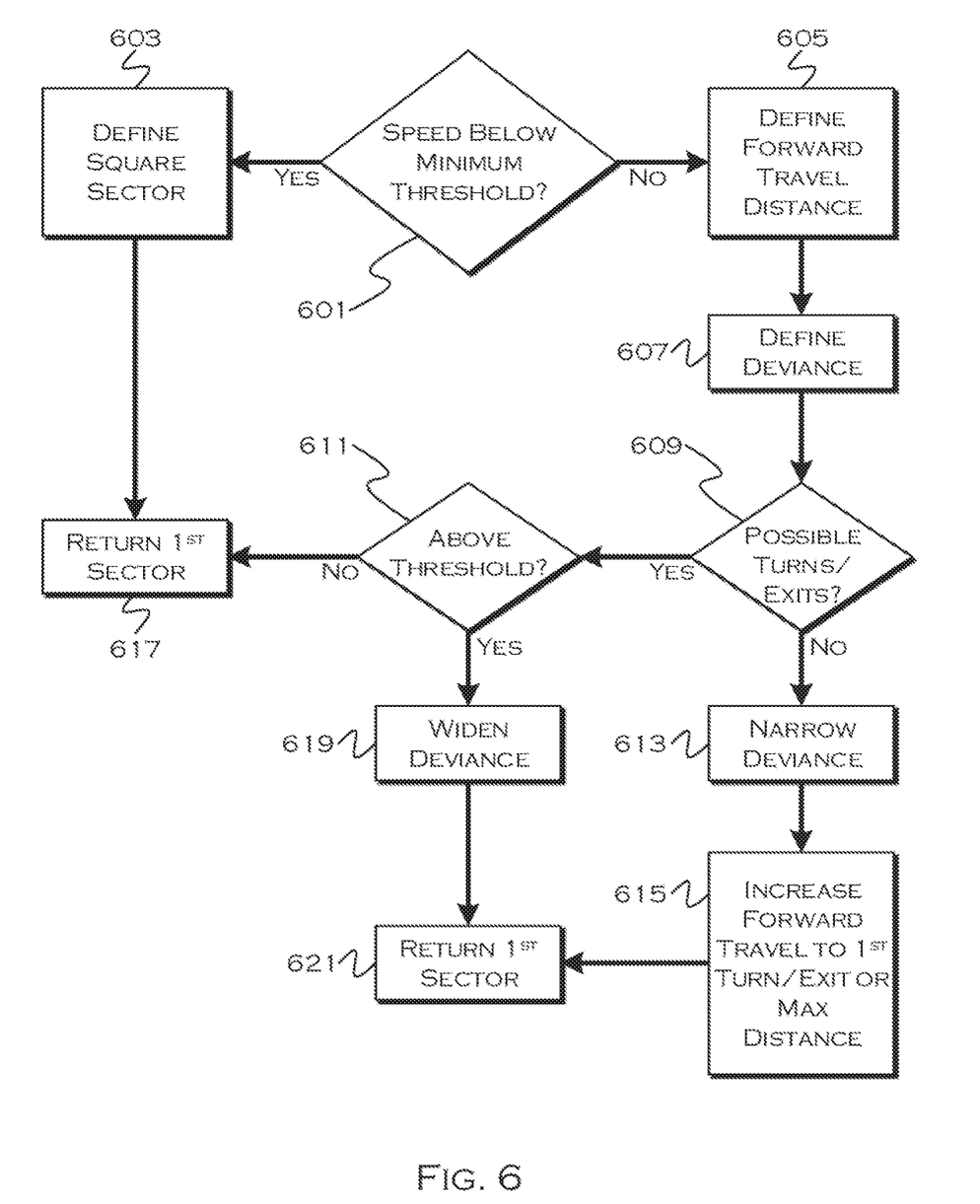
FIG. 6 shows an illustrative process for new-data fence sector definition.

FIG. 6 shows an illustrative process for new-data fence sector definition. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, a shape and perimeter of the local data sector is defined based on vehicle data. If the vehicle speed is below a minimum threshold (indicating a low or no speed) 601, the process may define a square, circular or otherwise surrounding perimeter with the vehicle at the center 603, since it may be unclear at the low or no speed in which direction the vehicle will eventually travel. This definition of the first sector is then returned 617 so that a snapshot of the coordinate data within the first sector can be sent to the vehicle.

If the speed is above the minimum threshold, the process will determine how far forward the vehicle is likely to travel within a predetermined time 605. The predetermined time can vary, for example, based on data transfer speeds, but the general goal is to define a sector of a size where usable data is downloaded quickly enough for the vehicle to use it, but large enough in size that the vehicle is not reaching the edge of the sector even as the sector is being received. Data transfer rates may thus play a role in this calculation. At the same time, the process does not want to download too much data in advance of a vehicle position, because the vehicle may not necessarily continue forward indefinitely, so an interplay between these considerations may be used to determine a reasonable forward distance defining a forward apex of the bounded sector.

A deviance is also defined 607, which is essentially the "width" of the sector. As seen in FIG. 2, the sector may be kite-shaped, so the deviance may not be fixed at all forward distances from the vehicle. A narrower, but longer kite may be defined, for example, for vehicles at higher speeds (since turning would require slow-down and is less likely at high speeds) whereas a broader, shorter kite may be defined for vehicles at lower speeds (typically surface road travel where turns may be more frequent).

The process may also consider, for example, if there are any possible turns or exits within the boundary currently defining the first sector 609. If there are no turns or exits possible, the process may narrow the deviance 613 (all the way down to close proximity to the road, if desired), because the vehicle cannot (presumably) travel in any direction but the present one. This may also result in an increase in the forward distance downloaded 615, which can be expanded to a reasonable predefined limit or, in another example, all the way to the first possible turn or exit. Since there are no exits or turns until the first possible turn, the chance that the vehicle will need the expanded data set is very high. At this point, the revised first sector is returned and the cloud sends a snapshot of the first sector coordinate data to the vehicle.

If there are possible turns or exits within the originally defined first sector 609, the process may determine if current vehicle speed is above a threshold 611, indicating that those exits or turns could result in the vehicle traveling outside the local data before new data could be downloaded (such as the branching highway example presented earlier). If so, the deviance may be widened 619 to provide for a larger local data set that can accommodate the potential turn.

It may seem reasonable to simply narrow the geo-fence to define a boundary closer to the vehicle in such an instance, which may work in some cases, but looking at the example in FIG. 2, if the branch in the highway was immediately in front of the vehicle, there is little distance between the geo-fence perimeter and the local data perimeter to begin with, so even narrowing the fence somewhat would not increase this distance a great deal. In these cases, it may be more reasonable to simply take a larger snapshot of local data. Also, as noted, instead of simply widening the deviance (which may be the fastest option), and off-shoot of data representing a small sector branching in the possible deviant direction may be utilized instead (resulting in a kite with a feature sticking out of the side, if the kite-shaped model is used).

Figure 7:
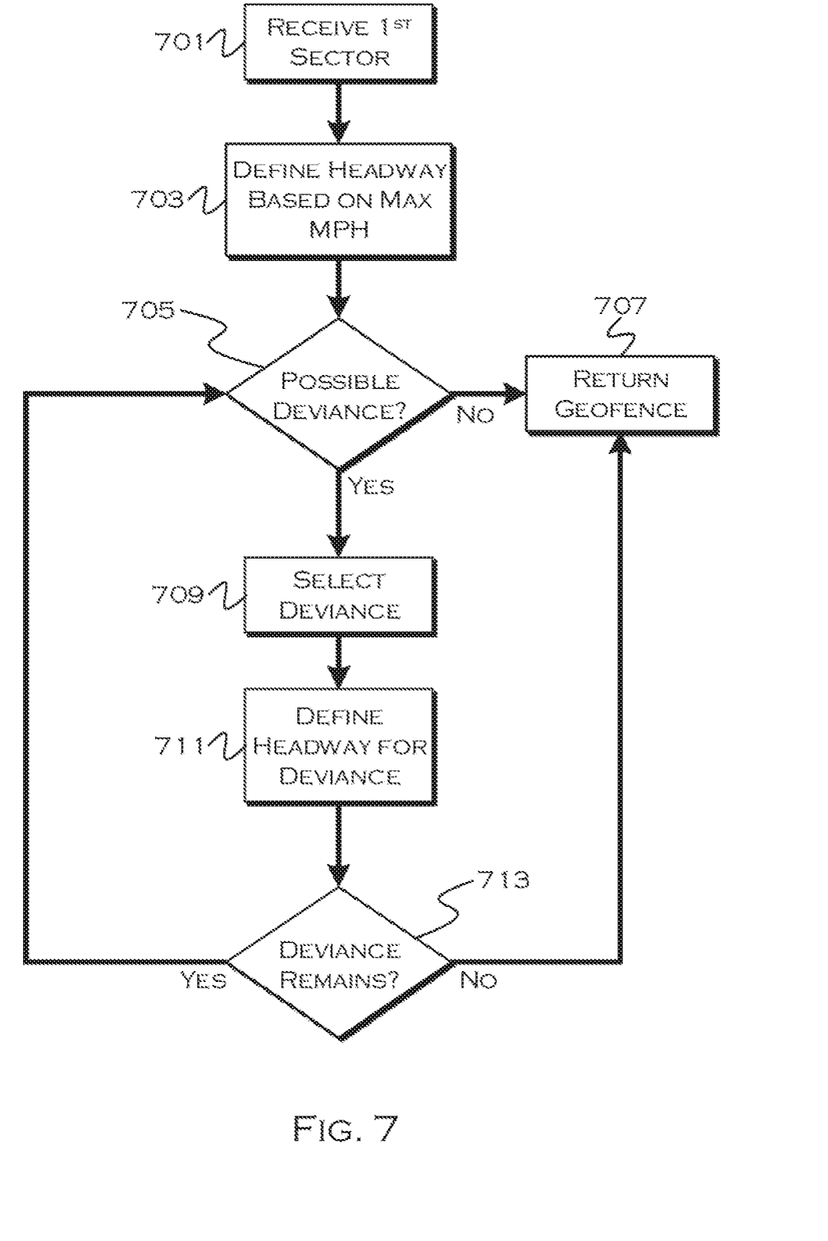
FIG. 7 shows an illustrative process for primary data sector definition.

FIG. 7 shows an illustrative process for primary data sector definition. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this example, the process receives the first sector definition 701, defined by a process such as the illustrative process shown in FIG. 6. This geo-fencing process can run on the cloud, on the vehicle, or on a combination of both. In this example, the process (running on the cloud) receives the first sector and defines a likely headway based on, in this example, a maximum miles per hour (which could be, for example, the speed limit plus a tolerance). This headway is defined such that a vehicle traveling forwards at the maximum speed, reaching the headway point, will still have sufficient time to download new map data before reaching the edge of the first sector. So, for example, if data download took ten seconds, then a vehicle traveling at 60 miles per hour, in a 50 mile per hour zone, towards a first sector boundary 2 miles down the road, might have a headway point set at around 1.83 miles, giving 0.17 miles worth of travel at 60 miles per hour (or ten seconds of travel) before the vehicle reaches the defined local sector boundary. Of course, more tolerance for possible slower downloads might be built in, so it may be more reasonable, for example, to set the headway point at around 1.7 miles or so.

It may seem more reasonable to simply place the geo-fence (of which the headway is an apex point), much closer to the vehicle, to avoid the chance of ever exceeding the local area boundary. But doing so will result in much more repeated download request (because the fence will be breached far more frequently) and thus there is a desire to balance limiting downloads with ensuring that the vehicle does not travel off the local map data set.

Also, in this example, the process determines if there is a possible deviance (such as in the branching highway example) 705. If there is such a deviance (essentially defining an irregularly shaped local boundary), the process will select a deviance 709 and define a separate headway for the deviance 711 to accommodate for the irregular local sector shape. This continues until no deviances remain 713. At this point, having established the headway points, the distance between the headway point and the local data perimeter can be used as a reference to establish a perimeter within the local boundary, representing the geo-fence. In at least one example, the distance between the local boundary and fence perimeter narrows as the fence approaches the vehicle. Generally, however, the fence will be of a roughly approximate same-shape as the local perimeter boundary (although dimensionally it may vary) in most examples. The geo-fence, thus defined, is then returned 707 for transmission to the vehicle (or use by the vehicle, if the process is on-board).

FIGS. 8A-8D show illustrative examples of various data sets defined downloaded under various travel conditions.

Figure 8A:
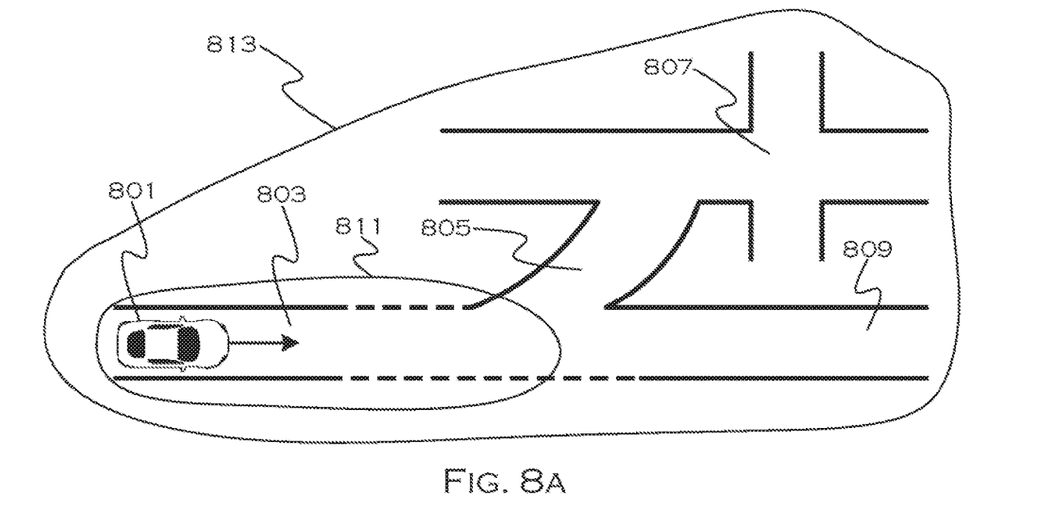
FIGS. 8A-8D show illustrative examples of various data sets downloaded under various travel conditions.

In the example shown in FIG. 8A, the vehicle 801 is traveling on a highway 803. There is one exit from the highway 805, which leads to a local intersection 807. In this example, the local data perimeter 813 is defined to accommodate a location where the vehicle can reach 809 in a predetermined amount of time. As this location is past a possible exit, the local boundary has also been modified to accommodate for the possibility of exit 805. Since the intersection 807 is the furthest the vehicle could travel in the predetermined amount of time, in this example, the perimeter reaches, but does not reach beyond, the intersection.

Also, in this example, the geo-fence 811 has been defined expansively enough to accommodate the exit 807. This ensures, in this example, that by the time the vehicle reaches the fence, it will be known whether the exit was taken or not. Had the fence ended prior to the exit, a new download accommodating both the exit data and forward highway data would have been needed, but only some portion of that data would have been useful (since the vehicle would either exit or not). In such cases, a process similar to that shown with respect to elements 609-615 can be used for geo-fence definition, so that the geo-fence incorporates at least one possible turn, preventing repetitive download of extraneous data.

Figure 8B:
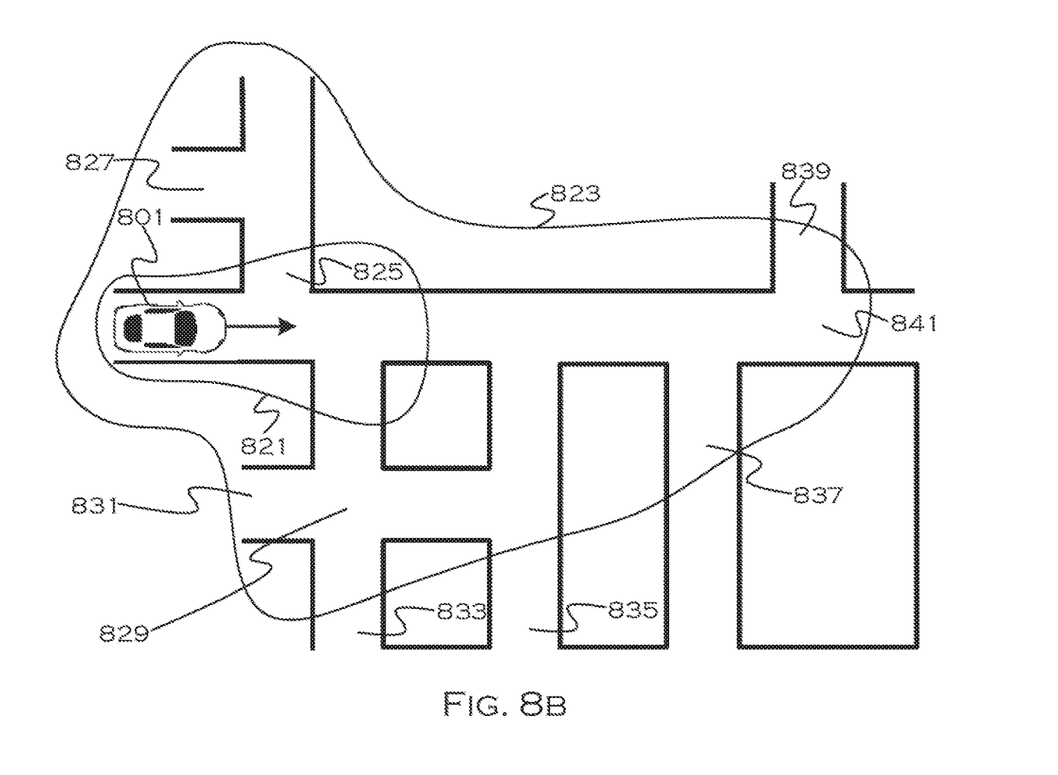

FIG. 8B shows a similarly irregular local data boundary 823, representing all points reachable at a current vehicle maximum speed (based on speed limit plus a tolerance). The outer points 827, 829, 831, 837, 839 and 841 represent points where the vehicle could reach during the time period. The points 827, 831 are closer to the vehicle than 839 and 841, because the vehicle may have to slow to turn, may encounter traffic signs, and they are more to the sides of the vehicle heading. The points 833 and 835 should be unreachable before an update is processed, unless the vehicle exceeds known speed limits by more than the tolerance and/or turns at an unexpected speed.

The fence 821 has been defined to incorporate two possible deviances 825 and the road leading to 829, so that by the time the fence is breached, it will be known which deviance was taken (if any), preventing re-download of the street data for streets that the vehicle is not taking.

Figure 8C:
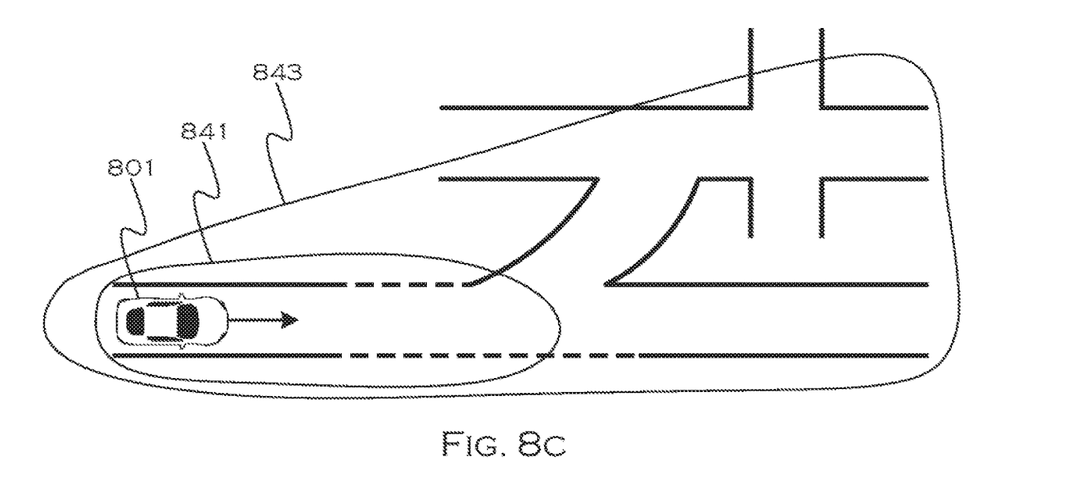
Figure 8D:
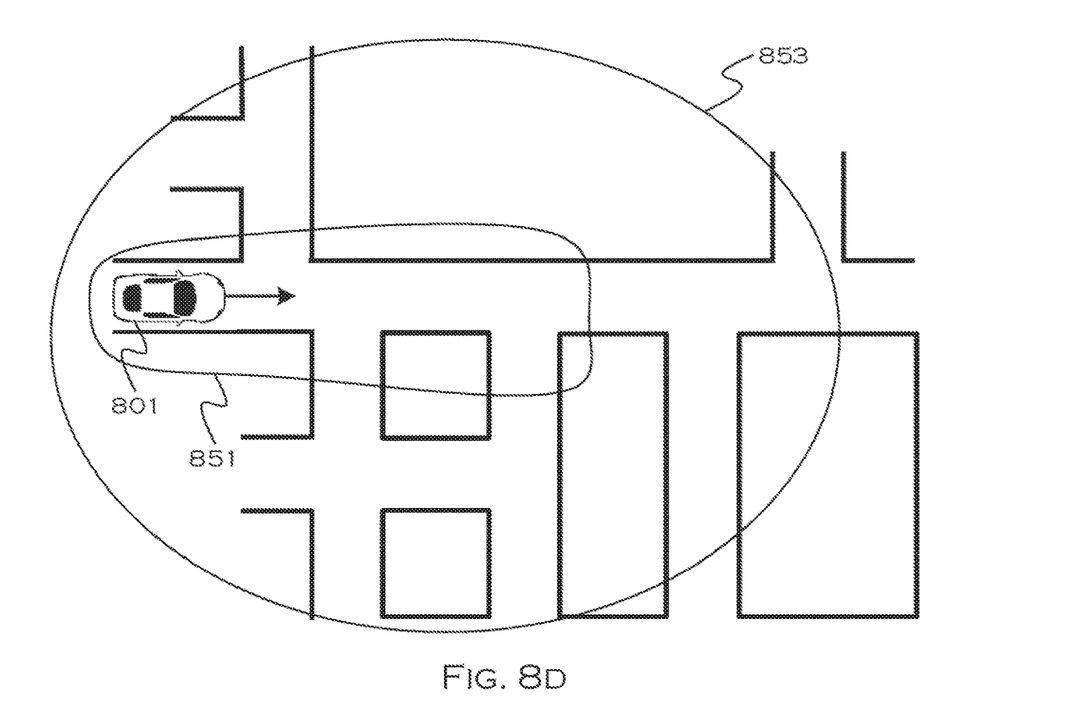

Such irregular boundaries may be used to define local coordinate sets if the processing time needed to define these boundaries does not result in unreasonable delay. The advantage of defining the boundaries in such a manner is that the amount of coordinate data downloaded may be limited. FIGS. 8C and 8D show examples of kite-within-kite boundaries, whereby more data may be downloaded, but there is no time wasted defining irregular boundary edges. This process may be faster, but may result in more data. The tradeoff between data-usage and time can be tailored as needed for a given solution.

In FIG. 8C, the vehicle 801 is again traveling on the highway as in FIG. 8A. Here, the wider local perimeter 843 is set to incorporate at least the same set of coordinate data as the irregular bounded area in FIG. 8A. But additional coordinate data is also downloaded in this example. The geo-fence perimeter 841 may be the same, again being set to incorporate at least one exit, so that there is not additional download of extraneous data. In this example, if the vehicle takes the exit, a new kite in the heading of the exit will be downloaded, which will incorporate the intersection but largely leave-off the remaining highway data.

In FIG. 8D, the vehicle 801 is traveling at a very low (below threshold for kite-data definition) speed. As a result a square (or round in this example) perimeter of local data is downloaded. Since the speed limit dictates that the vehicle could still reach the point defined in FIG. 8B as the outer forward point, the process has downloaded a relatively large area of local data. The geo-fence perimeter 851, in this example, has been set to accommodate more possible exits than in FIG. 8B. Since such a large data set, including data that is probably unneeded, surrounding the vehicle is downloaded, it may be desirable to wait and see where the vehicle turns before re-download. As the current speed is low, it is less likely the vehicle will rapidly accelerate and pass outside the boundaries of the local data set, so the fence perimeter can be expanded.

As can be seen in this example, the local boundary is not centered about the vehicle, because a u-turn is less likely than forward travel, although data surrounding the vehicle in equal directions could also be downloaded. In one example, the lower the vehicle speed, the more central the vehicle is to the local data set. So, for example, a vehicle moving at 0 miles per hour (parked) might have the local data set with the vehicle defining the center, whereas a vehicle traveling at 15 miles per hour (assuming an illustrative threshold of 20 miles per hour for circular/square download) might be more located towards an edge of the circle. This represents the increased likelihood of a vehicle turning completely around when traveling at near-zero speed (thus increasing the possibility that rear-ward data may be useful).

As can be seen from the illustrative embodiments, a variety of accommodations can be made in defining both the geo-fence and local data set. Generally, the illustrative embodiments serve to provide fast, data-limited download of local, useful data. The local data set is also refreshed with a frequency, defined by the geo-fence, such that it is unlikely that the vehicle will travel outside a local boundary before new local data is obtained.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
download a first set of map data, including a first defined perimeter, representative of a first predefined area around a current vehicle location;
define a first geofence within the first defined perimeter, such that a vehicle will encounter the first geofence prior to encountering the first defined perimeter;
responsive to the vehicle encountering the first geofence, download a second set of map data, including a second defined perimeter, representative of a second predefined area around a vehicle location when the vehicle encounters the geofence;
define a second geofence within the second defined perimeter, such that a vehicle will encounter the second geofence prior to encountering the second defined perimeter; and
move the perimeter of the first geofence inward towards a vehicle and away from the first predefined perimeter as a speed of the vehicle increases.

2. The system of claim 1, wherein a perimeter of the first geofence is defined at a distance from the first defined perimeter such that, based on a projected download time and vehicle speed, sufficient time exists to download the second set of map data as the vehicle travels from the perimeter of the first geofence to the first defined perimeter.

3. The system of claim 2, wherein the vehicle speed is based on a speed limit associated with a road crossing the first geofence at a location headed towards the first perimeter.

4. The system of claim 3, wherein the vehicle speed includes a predefined deviance above the speed limit.

5. The system of claim 2, wherein the speed is based on a vehicle speed at a time of downloading the first set of map data.

6. The system of claim 2, wherein the speed is based on a maximum road speed for all roads within the first defined perimeter.

7. The system of claim 2, wherein the processor is further configured to:
determine that a vehicle is traveling above a speed limit on a road within the first defined perimeter; and
responsive to the vehicle traveling above the speed limit, increase a distance between the perimeter of the first geofence and the first defined perimeter.

8. The system of claim 1, wherein the first predefined area is centered around the current vehicle location.

9. The system of claim 1, wherein the second predefined area is centered around the vehicle location when the vehicle encounters the first geofence.

10. The system of claim 1, wherein the first predefined area is centered around a point ahead of the vehicle along a defined route, such that the first predefined area includes the current vehicle location but also includes more of the defined route than would an area centered around the current vehicle location.

11. The system of claim 1, wherein the second predefined area is centered around a point ahead of the vehicle along a defined route, such that the second predefined area includes the vehicle location where the vehicle encountered the geofence but also includes more of the planned route than would an area centered around the vehicle location where the vehicle encountered the geofence.

12. A method comprising:
downloading a first set of map data, including a first defined perimeter, representative of a first predefined area around a current vehicle location;
defining a first geofence within the first defined perimeter, such that a vehicle will encounter the first geofence prior to encountering the first defined perimeter;
responsive to the vehicle encountering the first geofence, downloading a second set of map data, including a second defined perimeter, representative of a second predefined area around a vehicle location when the vehicle encounters the geofence;
defining a second geofence within the second defined perimeter, such that a vehicle will encounter the second geofence prior to encountering the second defined perimeter; and
moving the perimeter of the first geofence inward towards a vehicle and away from the first predefined perimeter as a speed of the vehicle increases.

13. The method of claim 12, wherein a perimeter of the first geofence is defined at a distance from the first defined perimeter such that, based on a projected download time and vehicle speed, sufficient time exists to download the second set of map data as the vehicle travels from the perimeter of the first geofence to the first defined perimeter.

14. The method of claim 13, further comprising:
   determining that a vehicle is traveling above a speed limit on a road within the first defined perimeter; and
   responsive to the vehicle traveling above the speed limit, increasing a distance between the perimeter of the first geofence and the first defined perimeter.

15. A non-transitory computer-readable storage medium, storing instructions that, when executed by a processor, cause the processor to perform a method comprising:
   downloading a first set of map data, including a first defined perimeter, representative of a first predefined area around a current vehicle location;
   defining a first geofence within the first defined perimeter, such that a vehicle will encounter the first geofence prior to encountering the first defined perimeter;
   responsive to the vehicle encountering the first geofence, downloading a second set of map data, including a second defined perimeter, representative of a second predefined area around a vehicle location when the vehicle encounters the geofence;
   defining a second geofence within the second defined perimeter, such that a vehicle will encounter the second geofence prior to encountering the second defined perimeter; and moving the perimeter of the first geofence inward towards a vehicle and away from the first predefined perimeter as a speed of the vehicle increases.

16. The non-transitory computer-readable storage medium of claim 15, wherein a perimeter of the first geofence is defined at a distance from the first defined perimeter such that, based on a projected download time and vehicle speed, sufficient time exists to download the second set of map data as the vehicle travels from the perimeter of the first geofence to the first defined perimeter.

17. The non-transitory computer-readable storage medium of claim 16, the method further comprising:
   determining that a vehicle is traveling above a speed limit on a road within the first defined perimeter; and
   responsive to the vehicle traveling above the speed limit, increasing a distance between the perimeter of the first geofence and the first defined perimeter.

* * * * *